UNITED STATES PATENT OFFICE.

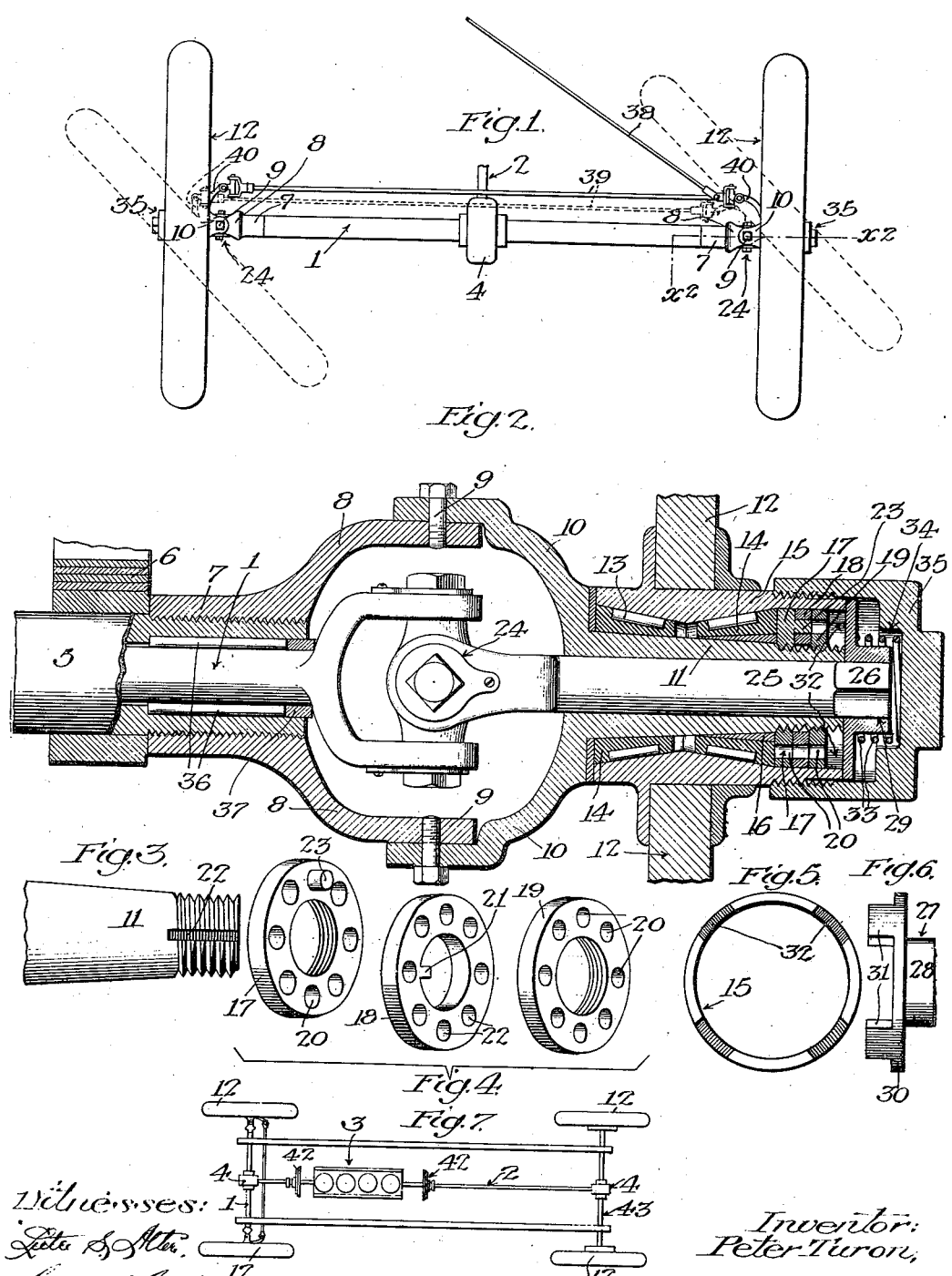

PETER TURON, OF LOS ANGELES, CALIFORNIA.

FRONT-WHEEL DRIVE FOR AUTOMOBILES.

1,012,936.	Specification of Letters Patent.	Patented Dec. 26, 1911.

Application filed December 27, 1909. Serial No. 535,188.

*To all whom it may concern:*

Be it known that I, PETER TURON, a citizen of the United States, residing at Los Angeles, in the county of Los Angeles and State of California, have invented a new and useful Front-Wheel Drive for Automobiles, of which the following is a specification.

This invention relates to means whereby the front steering wheels of an automobile are used as driving wheels.

One of the objects of my invention is to produce a device of the character described of simple and economical construction which will attain the desired results.

Another object of my invention is to produce a device of the character described in which the wheel may be readily disconnected from its driving means and allowed to run free therefrom.

Other objects and advantages will appear as hereinafter described.

Referring to the drawings which show an embodiment of my invention: Figure 1 is a plan view of the front axle and wheels.
Fig. 2 is a sectional view on lines $x^2$—$x^2$ Fig. 1. Fig. 3 is a side view of the end of the journal. Fig. 4 is a perspective view of the parts of a sectional locking nut. Fig. 5 is an end view of the wheel hub. Fig. 6 is a side view of the hub locking device. Fig. 7 is a diagrammatic plan view of the complete running gear.

1 designates the front axle of an automobile, 2 the shaft for transmitting power thereto from the engine or motor 3, and 4 is the differential or balance gear device. The axle 1 is divided into two parts driven concurrently by the differential. The axle 1 is inclosed in a tubular casing 5 which is in fixed relation to the chassis, the outer ends of the casing 5 being attached to the springs 6 of the chassis so as to support the chassis on the wheels. To support the wheels in a fixed vertical relation to the chassis in such a manner as to permit a deflecting movement of the wheels for the purpose of steering, a collar 7 is provided at each end of the casing 5, the collar 7 being provided with a pair of arms 8 pivoted at 9 to arms 10 on the journal 11 of the wheel 12. The journals 11 of the wheels 12 are provided with roller bearings 13 mounted in cages 14. The bearing faces of the rollers are at opposite angles to each other to correspond to the inner face of the hub 15. The cages 14 are interchangeable, a tapered sleeve 16 being provided between the outer cage 14 and the journal to compensate for the taper of the journal 11. The wheels 12 are held in place by means of a sectional locking nut composed of three members 17, 18 and 19, the members 17 and 19 of which are provided with holes 20 adapted to receive a tool or wrench for driving the members in place.
The member 17 is internally threaded to correspond to the threads on the journal 11 and is tightened thereon against the end of the outer cage 14. The member 18 has a smooth inner bore of a diameter large enough to slip over the threads on the journal and has an inwardly projecting key 21 adapted to engage a key-way 22 in the journal 11. The member 18 is adapted to be slipped on the journal and to be locked from turning thereon by the key 21. One of a series of holes 22 in the member 18 receives a pin 23 on the member 17 and thereby prevents the member 17 from turning on the threads of the journal, the member 17 having been turned to such a position that the pin 23 is in position to engage one of the holes 22 when the member is slipped on the journal 11. The member 18 is held from backing off from the member 17 by means of a member 19 which is provided with internal threads adapted to engage the threaded portion of the journal 11.

The front wheels 12 of the automobile are connected to be driven by the shaft members 1 by a universal drive coupling or gimbal joint connections 24 at each end of the shaft members 1. Extensions 25 of the shaft members 1 extend through the journals 11 and are provided at their outer ends with squared portions 26. The extensions 25 of the shaft members 1 are not secured to the journals in fixed longitudinal relation thereto but are free to slide in either direction longitudinally as it has been found that in turning the wheels the extensions 25 have a slight longitudinal movement in the journals 11.

The driving movement of the shaft members 1 through the extensions 25 is transmitted to the wheels 12 by locking members
27. Each locking member 27 is provided with a hub 28 having a square hole or opening 29 adapted to receive the squared end 26 of the shaft extension 25 and to be slidable thereon. Extending outwardly from the hub 28 is a circular plate 30 provided with laterally projecting square teeth or lugs 31 which engage similarly shaped recesses 32 in the end of the hub 15 of the wheel. Each locking member 27 is held against the end of the adjacent hub 15 by a coiled spring 33 which bears against the outer face of the locking member 27 and has its outer end seated within a recess 34 in a cap 35 adapted to screw on the hub 15 and inclose the various parts at the ends of the hub.

The shaft members 1 are provided at each end with roller bearings 36 held in position by a ring 37 between the shaft member and the casing 5 so as to reduce the friction of the running parts to a minimum.

The automobile is guided by operation of the steering rod 38 which is connected to a bar 39 connected at each end to rigid extensions 40 on the arms 10, which construction causes the wheels to turn in unison, being permitted to swing in a horizontal plane as indicated in dotted lines in Fig. 1, while sustaining the load on the wheel and maintaining the parts in proper vertical position.

It will be understood that the front wheel drive shown is preferably used in conjunction with the usual rear wheel drive as shown in Fig. 7, wherein the motor 3 is connected through clutches 42 and shafts 2 to the differentials 4 of the front and rear axles 1 and 43, the rear axles being mounted in fixed bearings on the chassis in the usual manner as they are not required to turn for steering purposes.

In case it may be advisable, through accident to the parts, or for other reasons, each locking member 27 may be readily removed from engagement with the squared end 26 of the shaft extension 25 and the hub 15 by removing the cap 35, and spring 33, after which the locking member 27 may be slipped off the squared portion of the extension 25 and the cap 35 replaced, after which the automobile may then be driven through the remaining wheels, the wheels from which the locking member has been removed being free to rotate without affecting the driving mechanism.

What I claim is:—

1. In combination with a chassis, the differential, and a divided front axle of an automobile, a casing for the axle, a pair of arms on each end of said casing, a journal pivoted thereto to turn in a horizontal plane, a wheel hub on the journal, said hub having notches in the end thereof, a driving shaft, a universal coupling in said driving shaft within the pivotal axis of said journal, said shaft extending slidably through said journal and provided at its outer end with a squared portion, a plate on said squared portion of the shaft, lugs on said plate engaging the notches in the hub, and means for yieldingly holding said plate in engagement with said journal and said hub comprising a cap adapted to fit over the end of said hub, and a coiled spring in said cap adapted to press against said plate.

2. The combination with the chassis, the differential, and a divided front axle of an automobile, a casing for the axle, a pair of arms on each end of said casing, a journal pivoted thereto to turn in a horizontal plane, a driving shaft, and a universal coupling in said driving shaft within the pivotal axis of said journal, said shaft extending slidably through said journal, means slidable on said shaft for locking said shaft to the wheel, and means for locking said wheel on said journal, said journal being provided with a threaded end portion and a key-way therein, said locking means comprising an inner member provided with a pin and threaded to receive said journal, an intermediate member having perforations therein adapted to receive said pin and provided with a lug for engaging said key-way on said journal, and an outer member threaded to engage the threaded end of said journal.

In testimony whereof, I have hereunto set my hand at Los Angeles, California, this 20th day of December 1909.

PETER TURON.

In presence of—
FRANK L. A. GRAHAM,
P. H. SHELTON.